J. T. Barnes,
Furniture Caster.
N° 66,116.     Patented June 25, 1867.

Witnesses:
Theo Fischer
J. A. Serwal

Inventor:
James T. Barnes
Per Munn & Co.
Attorneys

United States Patent Office.

JAMES T. BARNES, OF HUDSON CITY, NEW JERSEY.

Letters Patent No. 66,116, dated June 25, 1867.

---

IMPROVED CASTER.

---

The Schedule referred to in these Letters Patent and making part of the same.

---

TO ALL WHOM IT MAY CONCERN:

Be it known that I, JAMES T. BARNES, of Hudson City, in the county of Hudson, and State of New Jersey, have invented a new and improved Caster; and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

This invention relates to a new and useful improvement on a caster, for which Letters Patent were granted to me, bearing date October 30, 1866.

The invention consists in having the shank of the caster at one side of the axis of the wheels, whereby the caster is allowed to turn so that the wheels, when the article to which they are applied is moved, may adjust themselves in line with the movement of the article. The invention also consists in a novel manner of securing the metal socket or sheath, in which the shank of the caster is fitted, in the leg or bottom of the article to which the caster is applied, whereby the socket or sheath may be secured in the leg or bottom of the article with the greatest facility. In the accompanying sheet of drawings—

Figure 1:
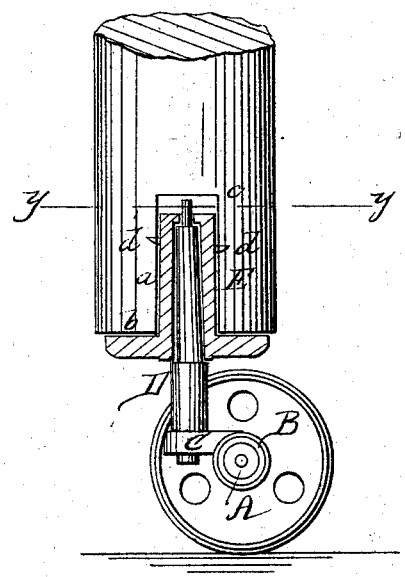
Figure 2:
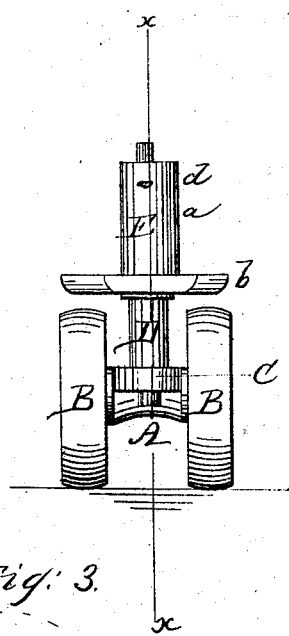

Figure 1 is a side sectional view of my invention, taken in the line $x\ x$, fig. 2.

Figure 2, an end view of the same.

Figure 3:
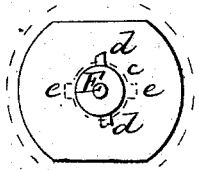

Figure 3, a horizontal section of the same, taken in the line $y\ y$, fig. 1.

Similar letters of reference indicate like parts.

A represents the axis or axle of the caster, having a wheel, B, secured on each end of it, in the manner as shown and described in the Letters Patent previously granted to me. The axle has an arm, C, projecting horizontally from it, and in the outer part of said arm the lower end of a shank, D, is firmly secured, (see fig. 1.) By this means the shank, it will be seen, is out of line with or at one side of the axle A, and consequently the wheels B B will be allowed to adjust themselves in line with the direction of the movement of the article to which the caster is applied, whenever said article is moved. This is an important feature of the improvement, and materially augments its value. E represents a metallic socket or sheath, which is inserted into the leg or bottom of the article to which the caster is applied. This socket or sheath is composed of a cylindrical tube, $a$, having a flange, $b$, at its lower end; and into the leg or bottom of the article to which the caster is to be applied there is bored a hole, $c$, to receive the cylindrical portion $a$ of the socket or sheath, (see fig. 1.) The cylindrical portion $a$ is provided with spurs $d\ d$, projecting laterally from it at opposite points; and the hole $c$ is grooved longitudinally, as shown at $e\ e$, to receive the spurs $d\ d$ and admit of $a$ being shoved into the hole $c$.

When $a$ is shoved into $c$ the former is turned a quarter of a revolution by grasping the flange $b$ with a wrench; and the spurs $d\ d$ cut their way through the wood in a circumferential direction relatively with the hole $c$, and said spurs thereby retain the socket or sheath in the leg or bottom of the article, and prevent, in case the article is raised from the floor, the socket or sheath from dropping out of the hole $c$. By this simple means the socket or sheath may be very readily secured in the leg or bottom of the article to which the caster is applied. It is superior to and less expensive than the screw-tube hitherto used, and far more reliable than the screwing of the flange $b$ to the leg.

Having thus described my invention, I claim as new, and desire to secure by Letters Patent—

1. The axle A supporting two wheels B, and having secured at its centre, and at right angles thereto, the arm C, supporting the shank D, constructed as described, for the purpose specified.

2. I further claim the securing of the socket or sheath E in the leg or bottom of the article to which the caster is applied by means of the spurs $d\ d$, projecting laterally from the cylindrical part $a$ and fitted in the hole $c$, which receives said part $a$, substantially as shown and described.

JAS. T. BARNES.

Witnesses:
WM. F. McNAMARA,
ALEX. F. ROBERTS.